3,108,016
SELF-EXTINGUISHING PLASTIC FILM

Murrey O. Longstreth, Elmer L. McMaster, and Floyd B. Nagle, all of Midland, Mich., assignors to The Dow Chemical Company, Midland, Mich., a corporation of Delaware
No Drawing. Filed Aug. 26, 1960, Ser. No. 52,066
9 Claims. (Cl. 117—137)

This invention relates to a method of fireproofing alkenyl aromatic resins, and more particularly polystyrene so that the treated material will display self-extinguishing characteristics.

While it is known to use certain compounds, such as ammonium bromide for fireproofing plastics of the type concerned herein, see for example the U.S. patent of John L. McCurdy and Leo Kin, No. 2,676,946, issued April 27, 1954, the known methods do not teach surface coating of such plastics for the fireproofing thereof. One advantage of surface coating such materials to achieve fireproofing results, is that contamination of the whole production process, with possible deleterious effects on the physical characteristics of the treated material, is avoided.

The method of the invention and the resulting product is especially suited for preparation of fireproofed polystyrene material for use as packing filler, or possibly in a sandwich type insulation board. The polystyrene material, which is an alkenyl aromatic resin, is preferably of the type manufactured and sold under the registered trademark "Styron," by The Dow Chemical Company of Midland, Michigan. The method of the invention not only results in satisfactory fireproofing of the Styron film in either ground, shredded, or sheet form, but provides the desired result in a conventient and economical manner.

The main object of the invention is to provide a method of fireproofing polystyrene materials, especially Styron.

A more specific object is to provide a method of fireproofing polystyrene materials which avoids contamination of a whole production process.

Still another object of the invention is the fireproofing of polystyrene materials with the use of ammonium bromide.

Another object is to provide a method of fireproofing polystyrene materials wherein only a surface coating is applied.

Still another object of the invention is to provide a method of fireproofing Styron film in either ground, shredded, or sheet form, which method is convenient and economical.

These and further objects and features of the invention will become more apparent from the following description.

Styron film without surface coating burns very readily, especially the melt of the film, however, after treatment according to the method of the invention, it is possible to apply a torch to the treated material and melt a portion without either the film or the melt burning after the torch is removed.

Due to the nature of Styron film, with a highly charged surface, the use of ammonium bromide in finely divided form, is readily attracted to the surface of the film. The ammonium bromide may further be made to better adhere to the film surface with the use of mild solvents such as olefin oxide, or ethyl laurate; this will prevent loss of ammonium bromide on contact with other objects before or during use. A 1.5% addition of olefin oxide has been found satisfactory for such purpose. The finely divided ammonium bromide used may have incorporated on, or within its particles, inhibitors, such as vinyl benzyl sulfonate, to prevent the corrosion of metals which with the treated material may come into contact.

Several methods may be utilized for surface coating the Styron with ammonium bromide depending upon the form of the Styron. For example, Styron film was ground in a plastic grinder using a ½" exit screen following which the ground material was weighed and placed in a rotating blender with finely dispersed ammonium bromide for a period of five minutes. The proportions of the blend were 213 gms. of ground Styron material and 13.3 gms. of spray dried ammonium bromide of which 10% by weight was vinyl benzyl sulfonate. The Styron material thus treated was found to have excellent fire inhibiting properties and would not support a flame when a torch was applied thereto. The ammonium bromide may be introduced in a plastic grinder or shredder during grinding or shredding. If batch blending is used one to five minutes is adequate; continuous blending may be employed by dusting in the ammonium bromide during blending operations.

Compositions of film and ammonium bromide prepared in the above described manner were made in the range of from 1% to 5% ammonium bromide by weight, and all were found to be self-extinguishing, although the melt of a 1% amomnium bromide coating would support a flame at spots. In tests it appeared that an ammonium bromide concentration range of 1% to 5% of polymer weight is optimum since a 1% composition was borderline as to burning of molten polymer, while amounts above 5% provided such a heavy coat that the ammonium bromide rubbed off very easily and did not appear to improve upon self-extinguishing characteristics. Increase in particle size of ammonium bromide leads to progressive decrease in self-extinguishing characteristics, it being recommended that the largest particle size be no greater than 200 mesh.

From the foregoing it will be seen that the method of the invention will satisfy the objectives as hereinbefore set forth.

The foregoing description has been given in detail without thought of limitation since the inventive principles involved are capable of assuming other forms without departing from the spirit of the invention or the scope of the following claims.

What is claimed is:

1. A method of fireproofing alkenyl aromatic resins by surface treating with a coating consisting of finely ground ammonium bromide.

2. A method of fireproofing polystyrene by surface treating with a coating consisting of finely ground ammonium bromide, said coating within a range of 1% to 5% by weight of the polystyrene.

3. A method of fireproofing polystyrene by surface treating with a coating consisting of finely ground ammonium bromide of particle size up to 200 mesh and within a range of 1% to 5% by weight of the polystyrene.

4. A method of fireproofing polystyrene by surface treating with a coating consisting of finely ground ammonium bromide which includes a corrosion inhibitor consisting of vinyl benzyl sulfonate.

5. A method of fireproofing polystyrene by surface treating with a coating consisting of finely ground ammonium bromide including a corrosion inhibitor of vinyl benzyl sulfonate and a mild solvent such as ethyl laurate.

6. A fireproofed polystyrene having a surface coating of finely ground ammonium bromide.

7. A fireproofed polystyrene having a surface coating of finely ground ammonium bromide of particle size up to 200 mesh and within a range of 1% to 5% by weight of the polystyrene.

8. A fireproofed polystyrene having a surface coating of finely ground ammonium bromide of particle size up to 200 mesh and within a range of 1% to 5% by weight of the polystyrene and including a corrosion inhibitor of vinyl benzyl sulfonate of 10% by weight of the ammonium bromide.

9. A fireproofed polystyrene according to claim 8, including a mild solvent of ethyl laurate.

References Cited in the file of this patent
UNITED STATES PATENTS

| | | |
|---|---|---|
| 1,612,104 | Eichengrum | Dec. 28, 1926 |
| 1,978,125 | Bennett | Oct. 23, 1934 |
| 2,452,054 | Jones et al. | Oct. 26, 1948 |
| 2,590,211 | Rugar | Mar. 25, 1952 |
| 2,676,946 | McCurdy et al. | Apr. 27, 1954 |